C. W. DAKE.
LOCK NUT.
APPLICATION FILED SEPT. 17, 1917.
1,321,894.
Patented Nov. 18, 1919.
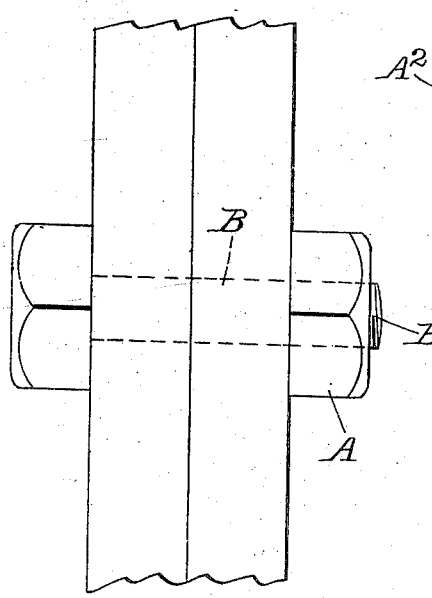
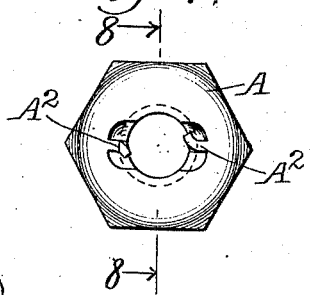
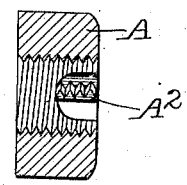
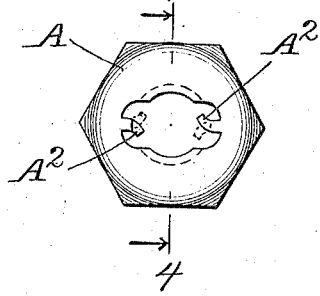
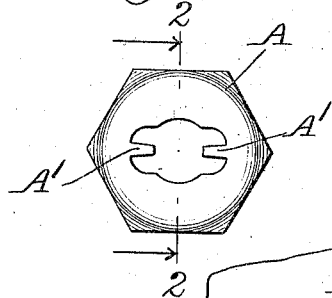
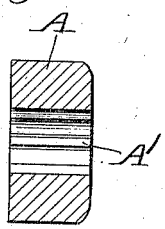
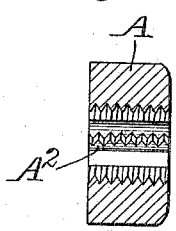
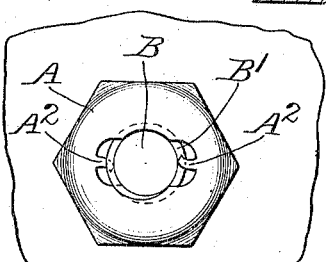
Witness.
Edward T. Wray.
Laurel M. Doemus.
Inventor.
Charles W. Dake.
by Parker & Carter
Attorneys.

UNITED STATES PATENT OFFICE.

CHARLES W. DAKE, OF CHICAGO, ILLINOIS.

LOCK-NUT.

1,321,894.  Specification of Letters Patent.  Patented Nov. 18, 1919.

Application filed September 17, 1917. Serial No. 191,685.

*To all whom it may concern:*

Be it known that I, CHARLES W. DAKE, a citizen of the United States, residing at Chicago, in the county of Cook and State of Illinois, have invented a certain new and useful Improvement in Lock-Nuts, of which the following is a specification.

My invention relates to lock nuts and has for one object to provide a new and improved form of lock nut which shall be self-locking, that is a lock nut which locks itself without the use of any separate nut. Another object is to provide an integral lock nut wherein all the parts both locking and holding are made in one piece and as a part of the integral nut.

Another object is to provide a lock nut which shall have no outwardly projecting part, which shall be completely self-contained, which will be automatic in its action, can be used many times, and which when the locking force has once been overcome, can be unscrewed without difficulty, but which can be put back into use immediately thereafter. Another object is to provide a lock nut wherein the locking force may be made so great if need be that it will be impossible practically to unscrew it. Other objects of my invention will appear from time to time in the specification.

My invention comprises generally a lock nut wherein a tongue projects inwardly from the bottom of a groove adjacent the bolt upon which the nut is mounted, and this tongue is adapted to engage the bolt itself and furnish a spring wedge so that when the nut is screwed forward the spring wedge gives and the nut can be moved. When an effort is made to move the nut in a rearward direction the wedged spring will engage the bolt and hold the nut against rotation thereupon until sufficient pressure has been brought to bear to turn the spring wedge member over.

My invention is more or less diagrammatically illustrated in the accompanying drawings, wherein—

Figure 1 is a plan view of the nut blank before it has been screw-threaded;

Fig. 2 is a section along the line 2—2 of Fig. 1;

Fig. 3 is a plan view of the nut blank after it has been screw-threaded; and

Fig. 4 is a section along the line 4—4 of Fig. 3;

Fig. 5 is a side elevation of a nut bolt and two plates fastened together by them;

Fig. 6 is a front elevation of the parts shown in Fig. 5;

Fig. 7 is a plan view of a modified form of nut;

Fig. 8 is a section along the line 8—8 of Fig. 7.

Like parts are indicated by like characters in all the drawings.

A is a nut blank. It will be stamped out in the usual nut-making machine and it may have one or two grooves on the side of the bore. Each groove has a tongue $A^1$ projecting upwardly from the bottom thereof into the bore. This nut blank is screw-threaded as shown in Fig. 3, the usual screw-threading top being used to do the work. As it screw-threads the nut it will bend the members at $A^1$ into an inclined position as shown at $A^2$ and screw-thread them as indicated in Fig. 4.

B is a bolt screw-threaded as indicated at $B^1$. The nut is screwed on it in the usual manner. It makes no difference whether it is a right hand thread or a left hand thread, the blanks are the same in every case. When they are screw-threaded the locking member is turned over into the proper direction. It will be understood, of course, that the sharp edge on the side of the locking member will engage the bolt and dig into it when an effort is made to turn the nut in a reverse direction, but so long as the nut is moved in the forward direction there will be no appreciable resistance. If the resistance is sufficiently great to compress the spring locking member and turn it around into the position shown in dotted lines, the nut can be unscrewed. If, now, you turn the nut back again the reverse movement takes place and the parts come back into the position shown in full lines. If, however, the size of the locking member is too great, that is to say, if it is made long enough, it will be too great to turn back and it would strip the threads before the nut can be unscrewed. Thus this device can be so arranged that it furnishes an unbreakable connection if that is desired, by merely making the flange or locking member sufficiently long.

It will be evident that while I have shown in my drawings an operative device, still many changes might be made in size, shape and arrangements of parts without departing materially from the spirit of my invention as defined by the appended claims, and I wish, therefore that my drawings be regarded as in a sense diagrammatic.

The use and operation of my invention are as follows:—

The master nut will be forged into shape with a plurality of longitudinal grooves in the wall of the central hole. These grooves may or may not extend throughout the entire length of the nut and they may or may not be parallel with the axis of the nut though preferably in order that they may be easy to manufacture and that the nut may be used from either end they will extend clear through the nut and be parallel with the axis thereof. Projecting inwardly toward the bore from the bottom of each of these slots is a flexible locking tongue which extends inwardly beyond the wall of the bore. The bore itself is screw-threaded in the usual manner as is the locking tongue.

When the nut is to be put into use it is screwed on the bolt in the usual manner. Since the tongues are rearwardly inclined they will offer no opposition to the travel of the nut along the bolt but if you undertake to withdraw the bolt the tongues will be wedged snugly against the side of the bolt and will resist very powerfully the return movement of the nut. This resistance will be so powerful in fact that under some circumstances the thread will be stripped before the nut can be removed.

There might be only one strip and only one channel. Preferably there are a plurality of them, and preferably two, because being diametrically opposed they balance the load and make the nut turn on the bolt more smoothly. There might be three or four, and possibly this would give an even better balance, but two makes a satisfactory balance, whereas one is likely to make the nut chatter.

In the modified form shown in Figs. 7 and 8, the holding member does not extend throughout the full length of the nut. In this case the cut away portion of the nut has that part that is farthest removed from the holding surface. Thus the nut is strengthened and there is a greater thread surface at the same time locking is sufficient. In this arrangement also if it should happen that the locking member strip the thread a little when not desired or expected the nut could still be used on the same bolt although in this instance the locking means would be inoperative.

I claim:—

1. The combination with a nut of an inwardly projecting flexible wedge strip disposed substantially parallel with the axis of rotation of the nut adapted to engage the bolt upon which the nut is screwed and to lock it against rotation.

2. The combination with a nut of flexible projections therefrom, disposed substantially parallel with the axis of rotation of the nut, adapted to engage and be wedged against a fixed surface and to lock the nut against rotation.

3. The combination with a nut of a flexible projection therefrom integral therewith disposed substantially parallel with the axis of rotation of the nut and adapted to engage and be wedged against a fixed surface and to lock the nut against rotation.

4. The combination with a nut having a central bore with a plurality of channels parallel to the sides thereof, of a plurality of flexible wedged tongues adapted to lie within said channels and to extend beyond it into the central bore of the nut adapted to engage and be wedged against the bolt upon which said nut is mounted and to lock the nut against rotation, said tongues threaded to correspond to the threads of the nut.

5. The combination with a nut of a flexible locking member disposed substantially parallel with the axis of rotation of the nut adapted to slidably engage a fixed surface, to travel therealong when the nut is moved in the forward direction, but to wedge itself thereagainst when the nut is moved in the return direction, said member having a sharp biting edge adapted to engage the fixed surface.

6. In a lock nut having a centrally disposed bore with a channel communicating therewith, and parallel thereto, a flexible wedge strip extending inwardly from said channel toward the center of the bore.

7. In a lock nut having a centrally disposed bore with channels communicating therewith, and parallel thereto, a screw-threaded flexible wedge strip extending inwardly from each of said channels toward the center of the bore.

8. In a single piece lock nut having a bore with channels communicating therewith and parallel thereto, locking members disposed along said channel and integral with said lock nut, said members adapted positively to resist unscrewing of the bolt, said members being effective along the entire length of the bore.

9. In a single piece lock nut having a centrally disposed bore, locking members disposed therealong, and integral with said nut, said members adapted positively to resist unscrewing of the bolt, and adapted to exert resistance along the entire length of the bore.

In testimony whereof, I affix my signature in the presence of two witnesses this fourteenth day of September, 1917.

CHARLES W. DAKE.

Witnesses:
  MINNIE M. LINDENAU,
  LAUREL M. DOREMUS.